(12) United States Patent
Theeten et al.

(10) Patent No.: US 8,856,242 B2
(45) Date of Patent: Oct. 7, 2014

(54) METHOD AND DEVICES TO SEAMLESSLY INJECT SERVICES IN CONTENT FLOWS

(75) Inventors: Bart Antoon Rika Theeten, Sint-Niklaas (BE); Eric Victor Waegeman, Sinaai (BE)

(73) Assignee: Alcatel Lucent, Boulogne Billancourt (FR)

(*) Notice: Subject to any disclaimer, the term of this patent is extended or adjusted under 35 U.S.C. 154(b) by 752 days.

(21) Appl. No.: 12/330,785

(22) Filed: Dec. 9, 2008

(65) Prior Publication Data

US 2009/0150503 A1 Jun. 11, 2009

(30) Foreign Application Priority Data

Dec. 10, 2007 (EP) .................................. 07291478

(51) Int. Cl.
*G06F 15/16* (2006.01)
*H04L 29/08* (2006.01)
*G06F 17/30* (2006.01)

(52) U.S. Cl.
CPC .......... *G06F 17/30899* (2013.01); *H04L 67/28* (2013.01); *H04L 67/2823* (2013.01); *H04L 67/2814* (2013.01)
USPC ........................................................ 709/206

(58) Field of Classification Search
USPC ........................................................ 709/206
See application file for complete search history.

(56) References Cited

U.S. PATENT DOCUMENTS

| 7,054,618 | B1 | 5/2006 | McCullough | |
|---|---|---|---|---|
| 2002/0124112 | A1* | 9/2002 | Tso | 709/246 |
| 2002/0174262 | A1* | 11/2002 | Marcos et al. | 709/315 |
| 2003/0028606 | A1* | 2/2003 | Koopmans et al. | 709/206 |
| 2003/0135411 | A1 | 7/2003 | Ushiki et al. | |
| 2004/0044732 | A1* | 3/2004 | Fushiki et al. | 709/205 |
| 2005/0267738 | A1* | 12/2005 | Wilkinson et al. | 704/9 |
| 2006/0010214 | A1* | 1/2006 | McDowell et al. | 709/206 |
| 2006/0129650 | A1* | 6/2006 | Ho et al. | 709/207 |
| 2007/0088852 | A1* | 4/2007 | Levkovitz | 709/246 |

(Continued)

FOREIGN PATENT DOCUMENTS

| JP | 2003-208373 A | 7/2003 |
|---|---|---|
| JP | 2003-216368 A | 7/2003 |
| JP | 2004-029939 A | 1/2004 |
| JP | 2007-233973 A | 9/2007 |

OTHER PUBLICATIONS

Elson, et al. "Internet Content Adaptation Protocol (ICAP)" Request for Comments: 3507, IETF, Apr. 2003, pp. 1-49, Retrieved from http://tools.ietf.org/pdf/rfc3507.pdf.

(Continued)

*Primary Examiner* — Shaq Taha
(74) *Attorney, Agent, or Firm* — Fay Sharpe LLP

(57) ABSTRACT

A method for automating service invocation in message flows between a client (2100) and a server (2104), includes a step of generating a message (2300) including content by said client (2100), a step of transmitting said message by said client (2100) via a network (2103) to said server (2104), wherein said method further includes a step of intercepting said message (2300) by a message interception device (2105) in the network (2103), and a step of determination by said message interception device (2105) whether a service is needed for further execution on said content part of said message. In case a service is needed, said method includes a further step of selecting at least one service engine for further execution of at least one service on said content part of said message.

9 Claims, 2 Drawing Sheets

(56) References Cited

U.S. PATENT DOCUMENTS

Figure 1:
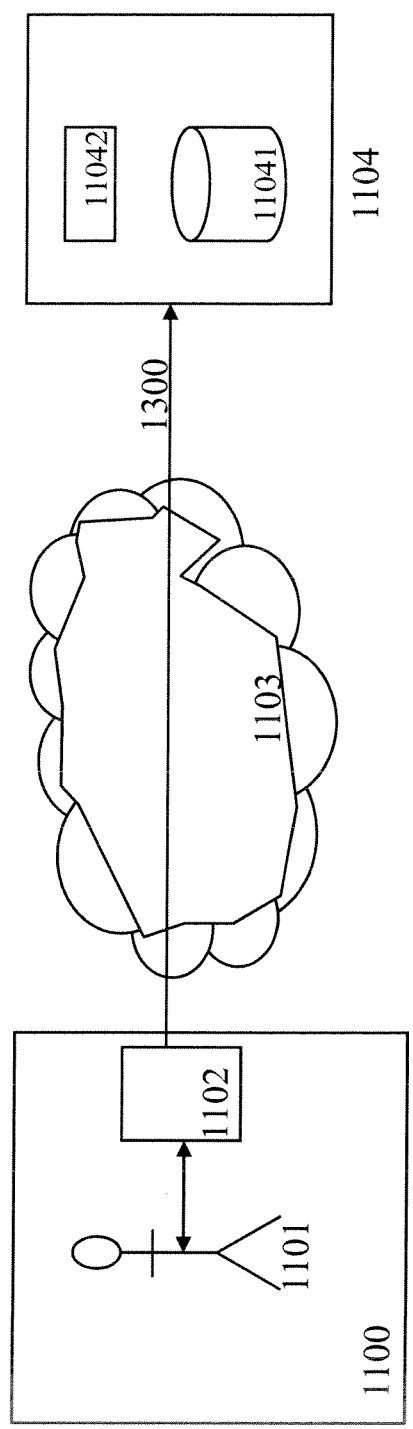

| | | | |
|---|---|---|---|
| 2007/0208754 A1 | 9/2007 | Iwasaki | |
| 2007/0282954 A1* | 12/2007 | Kim et al. | 709/206 |
| 2008/0034036 A1* | 2/2008 | Takeshima et al. | 709/203 |
| 2009/0043853 A1* | 2/2009 | Wei et al. | 709/206 |
| 2009/0113077 A1* | 4/2009 | Dahlen | 709/250 |
| 2009/0125595 A1* | 5/2009 | Maes | 709/206 |

OTHER PUBLICATIONS

Koyama et al., "Web Services Proxy: An Extensible Platform for Intermediaries of XML Networks," 2005 IEEE International Conference on Web Services, Orlando, FL, pp. 246-253, Jul. 2005.

Barrett et al., "Intermediaries: An Approach to Manipulating Information Streams," IBM Systems Journal, vol. 38, No. 4, pp. 629-641, 1999.

Vlaeminck et al., "Towards Transparent Personal Content Storage in Multi-Service Access Networks," Ghent University, Dept. of Information Technology—IBBT—IMEC, pp. 1-14.

European Search Report.

Budo, Takahiro, SSL VPN: Answer the questions at the time of introduction/construction/operation, N+1 Network Guide, Japan, SoftBank Publishing Corp., Aug. 1, 2004, vol. 4, No. 8, pp. 96-99.

* cited by examiner

METHOD AND DEVICES TO SEAMLESSLY INJECT SERVICES IN CONTENT FLOWS

The present invention relates to a method and devices for automating service invocation in message flows between a client and a server.

Many on-line storage providers are offering free storage space to end-users. Amongst them there are storage providers for storing images, videos, or documents which can all be considered as containing content. The current procedure a user has to follow if this user wants to put e.g. a set of images on such a storage server of an image storage provider, is that the user has to generate a message towards this storage provider, comprising in attachment the image to be stored. In case this user should now for instance want to have all his images corrected for red eyes, using commercially or freely available services for performing this action on the user's pictures, this user has to first subscribe or download this service, and next rigorously apply this service to all the pictures this user wants to finally transmit to the server. In case of many files or of large contents to be placed on the storage server, this will create a heavy workload for the user. Moreover this also requires the user to have a lot of intermediate storage space for storing the original contents files as well as the modified ones. This may not always be available.

An alternative may consist in the server offering this service to all images from all clients it receives. This replaces the workload and the space problem then to the server area, which may also not be desirable. Moreover not all services may be offered by such storage servers, again replacing the problems to the clients.

It is or object of the present invention to provide a method and devices for solving the aforementioned problem of manual intervention by the user for having the services he/she wants to be performed on the data or contents he/she want to transmit to a server, without having to write him or herself a specialized program in order to do so at the user's site, while thus at the same time also reducing the user's need for storage space at his or her computer or other storage devices. It is also an object of the present invention to relieve a server from this task, thus also reducing the server's requirement for storage space and additional service provision at this side.

According to the invention this object is achieved by the method including the step of intercepting the message including the contents, during the transmission of this message via a network between client and server, and of automatic determination whether or not any service is needed to take place on the content part of the message. This is achieved by means of a message interception device of the network, being capable of performing these method steps.

This means that the process of determining whether any of the desired services such as for instance red eye correction, additional data compression, . . . , is required, is now performed by means of a dedicated message interception device somewhere in the network. This enables to automate the process, alleviating the user, and the server, from this task. Moreover the service invoked will run at a service engine somewhere in a service environment network between client and server, thereby solving the problems of effort and space at both client and server.

Another characteristic feature of the present invention is set out in claims 2 and 7. This means that in case the message interception device has determined that one or more services are needed for being executed on the data content, the message interception device will select a specific one amongst several similar services, if this choice would be available, and adapt the original message, e.g. by adding the necessary information such as to further enable routing of the thus adapted message towards the selected service engine for executing this service on the data contents of the original and adapted message. This information may thus enable the message interception device, to determine a route towards this specific service engine somewhere in the network, for sending this adapted message to.

This determination and/or selection of the service can be solely based upon analysis of the content itself, or solely based upon information given by the client, or upon a combination of both, as set out in claims 3 and 8.

The present invention relates as well to a service engine which is capable of receiving and analyzing such an adapted message, as generated by the message interception device, and to determine therefrom whether or not to invoke operation of the service on the received contents part of this received adapted message. Upon executing the service, a second adapted message is then generated, for further provision by the service engine towards the server or back towards the message interception device.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein:

FIG. 1 schematically shows the prior art situation and

Figure 2:
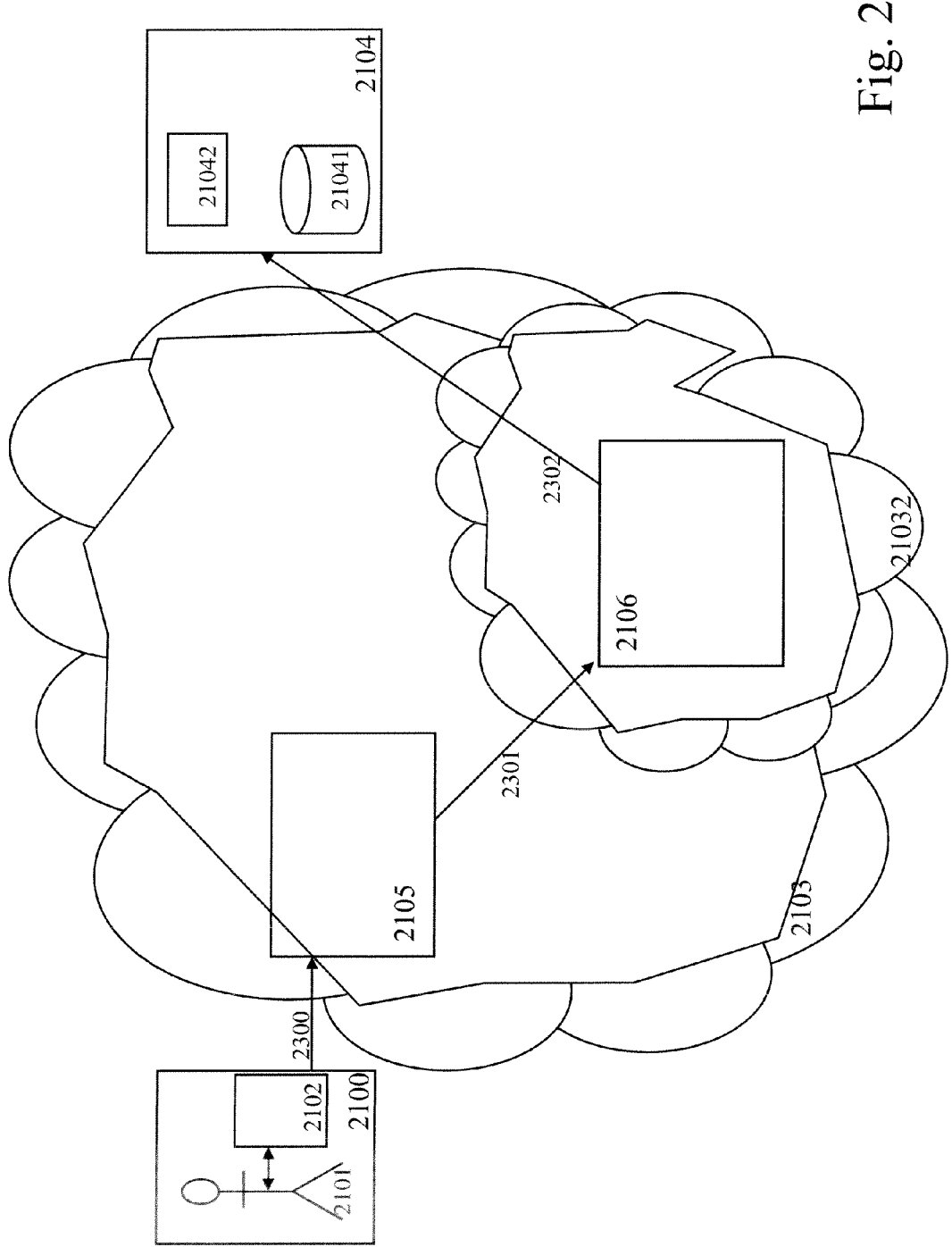

FIG. 2 shows an embodiment of the invention.

It is to be remarked that the following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The present invention describes a system and a method to automate added-value service invocation in content-related message flows between a client and a server. We will describe the invention by means of an example of picture uploading to a picture storage server, with additional service of red-eye correction to be executed on this picture. It is clear that the invention is as well applicable to all other applications or services which can run on all types of data or contents such as video, data files, audio files, . . . , transmitted by a client towards and to be subsequently received by a server.

Examples of such services are contained in the following non-exhaustive list:
- all types of image correction services such as sharpening, softening, color adaptation, . . . ,
- search services,
- content filtering services such as virus scan, parental control service, . . . ,
- reformatting services such as thumbnailing, format conversion, . . . ,
- transcoding services such as recoding, . . . ,
- translation services,
- Metadata generating/extractor services=Face recognition, Content analyzers, Summary service, Environmental input services
- Layout service,
- Content delivery services such as Streaming service, Broadcast/Distribution service, Publishing service
- Other services=Calendar, Location (GPS coordinate generation, deduction), etc The prior art situation, depicted in FIG. 1, shows a client 1100, in general comprising an end-user 1101 controlling an end-user apparatus 1102 such as a computer, mobile phone, GPS, game console, etc. This client is able to communicate with a distant server 1104 via a communications network 1103 such as the Internet or a mobile communications network, a satellite network, a GPS network etc. In the example depicted in FIG. 1 the end-user wants to upload some pictures stored on his end-user device 1102 such as computer or mobile phone on storage device 11041 such as a memory of the distant server 1104. To this purpose this end-user, by means of the end-user apparatus 1102, sends a picture upload request message 1300 to the server 1104. In the case of a computer as end-user apparatus, a webbrowser application running on the computer is often used for this. Such an application will enable the user, by selecting a sub-application generating a message from the user towards this server, including the specific picture the user wants to upload on the storage server, to transmit such a message. This picture upload request message 1300 is received by some routing devices within communications network 1103 which will subsequently route this message toward its destination, being storage server 1104.

In case of mobile phones, an MMS message, including a picture or video for transmission towards another subscriber to the mobile network, will as well generate a message including the picture contents.

In the typical situation where a Web Browser application is running on a pc, this Web browser application displays a web page corresponding to the dedicated front-end user interface offered by the on-line storage provider coupled to the server 1104 the end-user wishes to upload a picture to. The end-user 1101 then enters the URL of the picture in the input field provided on the web page and clicks on the web page's "upload" button. Alternatively the end user can manually attach the picture file to a message provided on this web page. The Web Browser on the end-user apparatus connects to the on-line storage provider through the internet or other network and sends for example an HTTP PUT request 1300 that traverses the network 1103 and is delivered via a delivery message to the on-line storage provider 11042 web service In FIG. 1 this on-line storage provider is depicted as block 11042 included in the server 1104.

As such, the picture is transferred from the end-user's PC to the on-line storage provider 1 1042, who subsequently stores the photo in the storage space 11041 of the server 1104.

However other ways without such web browser application are possible such as a dedicated photo/video/document/file upload applications or the already mentioned MMS service for mobile networks.

In the prior art situation, when this user wants to have his or her pictures corrected for red eyes, he or she has to install such a red-eye correction application on the end-user apparatus 1102 or on another end-user apparatus able to communicate with the first one. Each picture file is then to undergo this specific application.

In some situations the storage server or the linked on-line storage provider, could offer such service to take place on all incoming picture files. Nevertheless both methods put a serious burden on the storage capabilities of the client, the server, and generate a lot of additional work. Moreover not all storage providers or servers are prepared to offer a complete set of services users could wish to run on their data files.

The present invention therefore offers a solution to these problems as will be described in the following paragraphs with reference to FIG. 2.

In FIG. 2 reference numberings 2100, 2101, 2102, 2103, 2104, 21041 and 21042 refer to the same functional blocks as these indicated by reference numbers 1100, 1101, 1102, 1103, 1104, 11041 and 11042 in FIG. 1 respectively.

The problems associated with the prior art situation are solved by means of a message interception device within the network. This message interception device is depicted n FIG. 2 as device 2105 being part of the communications network 2103. This message interception device is adapted to intercept messages such as message 2300 including content, and to determine therefrom whether or not a service is needed to be executed upon the content of this message. To this purpose the message interception device is adapted to receive such messages 2300 including content, and to analyze them for determining whether a service is needed for further execution on said content part of said message. This determination can be entirely based upon the contents itself, but can in other embodiments also be based upon information previously communicated by the user to this message interception device. In yet other embodiments a combination of both inputs may be used.

In the particular case of the red-eye reduction, an embodiment of the message interception device 2105 depicted in FIG. 2, can deduce from the content of the message, being a picture, that a red-eye removal service might be desirable or necessary. The criteria for this determination may be fixed and preconfigured, or can be based upon user input previously communicated by the user by means of an optional user interface of the message interception device. This optional user interface is thus able to communicate with the client such that the user-preferences for the client can be initially communicated and stored before actual messages including content are transmitted by this user and subsequently intercepted by the message interception device. In general such a message interception device with such a user-interface can also communicate with more than one user, but this is not necessary. In case of communication with several users, all user-preferences can be initially stored or communicated. In even yet more sophisticated embodiments the user interface of this message interception device can communicate with the user or users, during or immediately after the interception of the message, and ask for the user-preferences immediately after reception of the message.

In case the message interception device decides that a red-eye removal service is needed, it will search for such service within a service environment network 21032 for such available services. Upon detection of one or more available of these services it will select one to be used on the content data. Again the selection criteria may be pre-configured, or determined based upon the contents itself, or communicated earlier via the user-interface, by the user. This depends upon the specific embodiment of the message interception device.

In FIG. 2 the service environment network is part of the general communications network 2103, being the Internet for the described example. However in other embodiments, a service environment network will be used which is different from the one for the general routing and communication. This can for instance be the case in mobile communication, where the mobile communications network for routing and transmission of the message is different from e.g. the Internet used for selecting the service engine.

Once a selection is made, the message interception device will further adapt the original message such as to enable further routing the thus adapted message to the selected service engine for further execution of the service on the data. The adapted message is depicted as 2301, and is then transmitted by the message interception device to the selected service engine 2106.

This service engine is then capable of running the red-eye removal service. It will therefore first receive such adapted messages and analyze them for checking whether they contain an indication that the service has to run upon the contents of the message. Upon detection and check of this indication that indeed this service is needed for execution on the contents, this action is performed. The now adapted contents is put again into the received message, thereby generating a second adapted message, denoted 2302. This is intended to be further routed, either back to the message interception device 2105, either to the storage server 2104, or either to a next service device. In FIG. 2 the situation of direct routing or transmission towards the storage server is depicted.

In case the secondly adapted message is sent back to the message interception device 2105, the latter can either determine whether another service might be desirable and accordingly repeat the whole procedure again, or decide that this message can be sent to the final destination, being the storage server 2104. In the latter case, the message is again adapted by the message interception device such as to contain information that the message is now to be sent to this storage server 2104, via the communications network 2103.

In some embodiments the message interception device is also able to decide, based on the originally received message from the user and/or on the stored or communicated user-preferences, how many and which services are to be selected. In that case the message interception device adapts the originally received message such as to include all the necessary information with respect to the correct indication and routing of the message towards and via all respective service engines. Upon receiving such an adapted message, the service engine will check and, if necessary, execute the service upon the contents of the message, and will further route the thus adapted message towards the next service engine, which information was already contained in the message received by the service engine, by means of an address or other information. When the last service device has executed its service on the data, some embodiments will route the adapted message back again towards the message interception device, or other embodiments will send the last adapted message to the server.

In some embodiments using the Internet as communications network, an HTTP Proxy can be further used in between the end-user's apparatus and the message interception device. Such a HTTP Proxy is in charge of intercepting HTTP messages generated by the end-user, and originally destined for the on-line storage provider. The HTTP Proxy is introduced into the message flow, either through configuration of the web browser on the end-user apparatus by the end-user itself or by network settings in the internet service provider's access network.

As already mentioned, some embodiments of the message interception device may further contain a user interface. This user interface can be used by the end-user to configure which services should be inserted in the message flow. This configuration may take the form of a content workflow.

Also an optional user profiling engine, being in charge of extracting user profiling information from incoming content-related messages, may be included in the message interception device. The user profiling information can later be used for targeted advertisement purposes.

Advantages of an embodiment with such a user interface, are that the end-user is in control of his user experience. He/she can shop around for an interesting service and inject it in content flows (e.g. image upload request, video download/streaming request, document search request). Moreover the end-user gets an integrated experience across all storage solutions he/she is subscribed for.

As already mentioned the process of enriching/correcting personal content before uploading by the user, or filtering content before downloading by the server, becomes automated.

Some embodiments of a message interception device are realized by means of software instructions on software carrier or by means of a software program to be installed on a computer in the network. However other embodiments for realizing such a message interception device are also possible.

The same considerations apply for the realization of embodiments of the service engine.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

While the principles of the invention have been described above in connection with specific apparatus, it is to be clearly understood that this description is made only by way of example and not as a limitation on the scope of the invention, as defined in the appended claims.

The invention claimed is:

1. A method for automating service invocation in message flows between a client and a server, said method comprising:
   generating a message including a content part by said client;
   transmitting said message by said client via a network to said server;

wherein said method further includes intercepting said message by a message interception device in the network, said message interception device not having been addressed or referenced in any portion of said message;

determining by said message interception device whether a service is needed for further execution by at least one service engine of a service environment network on said content part of said message, wherein said service is not requested or referenced in any portion of said message; and selecting, by the message interception device, at least one service engine for further execution at least one service on said content part of said message, and adapting, by the message interception device, said message such as to include the necessary information to further route said message towards said at least one service engine, thereby generating an adapted message.

2. The method according to claim 1 wherein said determining is based upon said content included in said message and/or upon information related to said client.

3. The method according to claim 1 further comprising:
routing the adapted message towards said at least one service engine.

4. The method according to claim 3 further comprising:
determining, by said service engine whether an additional service is needed.

5. A message interception device of a network between a client and a server, said message interception device comprising: at least one processor adapted to receive a message including content from said client with destination to said server, said message interception device not being addressed or referenced in any portion of said message, to analyze said message and to determine therefrom whether a service is needed for further execution by a service engine of a service environment network on said content part of said message, wherein said service is not requested or referenced in any portion of said message and adapted to determine, in case a service is needed, at least one service engine for further execution of at least one service on said content part of said message, and to adapt said message such as to further include the necessary information to further route said message to said at least one service engine, thereby generating an adapted message for transmission to said at least one service engine.

6. The message interception device according to claim 5 further being adapted to receive client information related to said client and to perform said determination based upon said client information and/or based upon information extracted from said content of said message.

7. A service engine for executing a service on a content part of a message, said service engine being operative to receive an adapted message previously generated by a message interception device that intercepted said message and determined that a service is needed for further execution on said content part of said message by at least the service engine and to determine therefrom whether or not to invoke operation of said service on said content from said adapted message, wherein said service is not requested or referenced in any portion of said message and said service engine being further operative to generate a second adapted message for further provision towards a server or to said message interception device.

8. The service engine according to claim 7 further being operative to determine, from said adapted message, whether an additional service is needed, and to further route said second adapted message towards an additional service engine.

9. The method of claim 1 wherein generating the message including the content part comprises:
generating the message including the content part by said client), the content part including at least one of an image, video, audio, document and data file.

* * * * *